(12) United States Patent
Cha

(10) Patent No.: US 7,243,994 B2
(45) Date of Patent: Jul. 17, 2007

(54) CONTINUOUSLY OPERABLE SEAT-RECLINING DEVICE FOR VEHICLES

(75) Inventor: Jae-Won Cha, Kyungju-Shi (KR)

(73) Assignee: DAS Co., Ltd., Kyungju (KR)

( * ) Notice: Subject to any disclaimer, the term of this patent is extended or adjusted under 35 U.S.C. 154(b) by 223 days.

(21) Appl. No.: 10/986,029

(22) Filed: Nov. 12, 2004

(65) Prior Publication Data

US 2005/0110322 A1    May 26, 2005

(30) Foreign Application Priority Data

Nov. 26, 2003    (KR) ...................... 10-2003-0084451

(51) Int. Cl.
*B60N 2/02* (2006.01)
*F16H 1/32* (2006.01)

(52) U.S. Cl. ...................... 297/362; 475/162

(58) Field of Classification Search ................ 297/362, 297/374; 745/162, 175, 180
See application file for complete search history.

(56) References Cited

U.S. PATENT DOCUMENTS 5,810,442 A * 9/1998 Ito et al. ................ 297/362.11
6,578,921 B2 * 6/2003 Koga et al. .................. 297/362
6,619,743 B1 * 9/2003 Scholz et al. ............... 297/362
6,637,821 B2 * 10/2003 Lee et al. .................... 297/362
6,755,470 B2 * 6/2004 Iwata et al. ................. 297/362
6,918,635 B2 * 7/2005 Finner et al. ............... 297/362

\* cited by examiner

*Primary Examiner*—Peter M. Cuomo
*Assistant Examiner*—Sarah B. McPartlin
(74) *Attorney, Agent, or Firm*—Mayer, Brown, Rowe and Maw LLP

(57) ABSTRACT

Disclosed herein is a continuously operable seat-reclining device having an improved actuator to substantially carry out a reclining operation of the reclining device such that an actuating force of a shaft is uniformly transmitted to the entirety of a coupling. The continuously operable seat-reclining device basically comprises an upper teeth bracket and a lower teeth bracket securely fixed to a seat back frame and a cushion frame, respectively, the upper teeth bracket being provided with upper teeth, the lower teeth bracket being provided with lower teeth, the upper teeth of the upper teeth bracket being engaged with the lower teeth of the lower teeth bracket, a cam hole formed at the center of the lower teeth bracket, and an actuator disposed between the cam hole and the cam-maintaining ring for moving the upper teeth bracket relative to the lower teeth bracket.

5 Claims, 4 Drawing Sheets

CONTINUOUSLY OPERABLE SEAT-RECLINING DEVICE FOR VEHICLES

BACKGROUND OF THE INVENTION

1. Field of the Invention

The present invention relates to a continuously operable seat-reclining device for vehicles, and more particularly to a continuously operable seat-reclining device that can be continuously operated when the back of a seat is angularly moved forward and backward on the basis of the figure of a passenger.

2. Description of the Related Art

A seat-reclining device is a device that is capable of adjusting the angular forward and rearward movement of the back of a seat on the basis of the figure of a driver or a passenger.

In a conventional seat-reclining device, the angular forward and rearward movement of the back of a seat is adjusted by controlling a lock gear, which is operated by a lever, and upper teeth formed at an upper teeth bracket. However, the conventional seat-reclining device has problems in that the angular forward and backward movement of the back of the seat is abruptly adjusted, and therefore the angular forward and backward movement of the back of the seat cannot be finely adjusted. For this reason, continuously operable seat-reclining devices have been increasingly used that are capable of adjusting the angular forward and rearward movement of the back of a seat in a stepless fashion.

Each of the continuously operable seat-reclining devices is operated in the forward or reverse direction in a stepless fashion by means of a lever protruded from one side of the seat or a switch that operates a motor. Each of the continuously operable seat-reclining devices mainly comprises an eccentric cam disposed inside the gears formed at a lower teeth bracket and an upper teeth bracket such that the eccentric cam is rotated to move pitches corresponding to the difference, in the number of teeth, between the lower teeth bracket and the upper teeth bracket, and wedge blocks that control the eccentric cam to prevent a gap while the seat-reclining device is not operated.

Such continuously operable seat-reclining devices have been filed in the name of the applicant of the present application. One example of the continuously operable seat-reclining devices is disclosed in Korean Patent Application No. 10-2003-0025378, wherein a seat-reclining device 30 comprises: an upper teeth bracket 1 having upper teeth 3 formed therein; and a lower teeth bracket 2 having lower teeth 4 formed therein. The upper teeth bracket 1 is securely fixed to a seat back frame, and the lower teeth bracket 2 is securely fixed to a cushion frame.

Between a cam hole 5 formed at the lower teeth bracket 2 and a cam-maintaining ring 6 integrally formed with the upper teeth bracket 1 such that the cam-maintaining ring 6 is protruded from the upper teeth bracket 1 toward the lower teeth bracket 2 is disposed an actuator 10 that is capable of moving the upper teeth bracket 1 relative to the lower teeth bracket 2 so that a reclining operation is substantially carried out.

Around the cam-maintaining ring 6 is disposed a needle bearing 11 to reduce frictional force, and thus improve the reclining operation. Inside the needle bearing 11 is disposed a cam 12 eccentric to the cam-maintaining ring 6.

Inside the cam 12 is formed a wedge groove 15, and in the wedge groove 15 are disposed arch-shaped wedge blocks 16 and 17 to control the movement of the cam 12 such that the cam is eccentric to the cam-maintaining ring 6.

In spring grooves 18, which are formed at the opposite inner ends of the wedge blocks 16 and 17, are disposed wedge springs 19 that increase the distance between the wedge blocks 16 and 17.

An operating surface 13 of the cam 12 is fixed to a shaft 20, which is disposed at the rear of the upper teeth bracket 1. On the outer circumference of the cam 12 is fitted an actuating pin 22 protruded inward from the inside surface of a coupling 21, to which a driving unit is coupled.

In the above-described continuously operable seat-reclining device for vehicles, the cam is maintained by means of the needle bearing. As a result, the continuously operable seat-reclining device for vehicles is affected by vibration generated when the continuously operable seat-reclining device for vehicles is operated or the continuously operable seat-reclining device for vehicles is mounted in the vehicle. Consequently, the cam is not stably maintained.

Especially, an actuating force transmitted through the shaft is applied to the small-sized actuating pin protruded from the coupling, and the cam is moved in the forward and reverse directions by means of the actuating pin. Consequently, serious actuating load is generated at the coupling.

When the above-mentioned actuating load is generated, the actuating force of the shaft is not uniformly transmitted to the coupling. As a result, the shaft is eccentric to one side such that a great amount of the force is transmitted to the actuating pin. Consequently, friction is caused between the shaft and the cam-maintaining ring, by which the actuating load is generated at the entirety of the shaft.

In the above-described continuously operable seat-reclining device for vehicles, the needle bearing is affected by vibration, the actuating force is not satisfactorily transmitted by means of the shaft, and the seat-reclining device is not smoothly operated due to the actuating load. Also, the operation of the continuously operable seat-reclining device is deteriorated as time goes by.

SUMMARY OF THE INVENTION

Therefore, the present invention has been made in view of the above problems, and it is an object of the present invention to provide a continuously operable seat-reclining device having an improved actuator to substantially carry out a reclining operation of the reclining device such that an actuating force of a shaft is uniformly transmitted to the entirety of a coupling that moves a cam while the actuator is not affected by vibration, whereby actuating load is reduced, and thus the smooth operation of the seat-reclining device is accomplished while the quality of the seat-reclining device is improved, and convenience of use is improved.

In accordance with the present invention, the above and other objects can be accomplished by the provision of a continuously operable seat-reclining device that can be continuously controlled in a stepless fashion, the device comprising: an upper teeth bracket and a lower teeth bracket securely fixed to a seat back frame and a cushion frame, respectively, the upper teeth bracket being provided with upper teeth, the lower teeth bracket being provided with lower teeth, the upper teeth of the upper teeth bracket being engaged with the lower teeth of the lower teeth bracket; a cam hole formed at the center of the lower teeth bracket; a cam-maintaining ring formed at the upper teeth bracket, the cam-maintaining ring being protruded toward the lower teeth bracket; and an actuator disposed between the cam hole and the cam-maintaining ring for moving the upper teeth bracket relative to the lower teeth bracket so that a reclining operation is carried out, the actuator comprising: a slide bearing disposed around the cam-maintaining ring for reducing a frictional force, and thus improving the reclining operation, the slide bearing being formed in the shape of a circle; a cam disposed inside the slide bearing, the cam being formed in the shape of a circle; a wedge groove formed inside the cam; arch-shaped wedge blocks disposed in the wedge groove for restricting the operation of the cam to control the movement of the upper teeth bracket; a release projection partially formed along the inner circumference of the wedge groove such that the release projection comes into contact with the ends of the wedge blocks to release the wedge blocks; wedge springs disposed in spring grooves formed at the opposite inner ends of the wedge blocks for increasing the distance between the wedge blocks; and a coupling attached to the outside of the cam, the coupling being fixed to a shaft disposed at the rear of the upper teeth bracket.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a front view showing the continuously operable seat-reclining device for vehicles according to the preferred embodiment of the present invention when the continuously operable seat-reclining device for vehicles is assembled;

FIG. 6 is a cross-sectional view of the continuously operable seat-reclining device for vehicles according to the preferred embodiment of the present invention taken along line A—A of FIG. 5;

FIG. 7 is a front view of the continuously operable seat-reclining device for vehicles according to the preferred embodiment of the present invention showing main components exposed when the continuously operable seat-reclining device for vehicles is assembled;

FIG. 8 is a cross-sectional view showing main components of the continuously operable seat-reclining device for vehicles according to the preferred embodiment of the present invention when the continuously operable seat-reclining device for vehicles is not operated; and FIG. 4 is an exploded perspective view showing a continuously operable seat-reclining device 50 for vehicles according to a preferred embodiment of the present invention, FIG. 5 is a front view showing the continuously operable seat-reclining device 50 for vehicles according to the preferred embodiment of the present invention when the continuously operable seat-reclining device for vehicles is assembled, FIG. 6 is a cross-sectional view of the continuously operable seat-reclining device 50 for vehicles according to the preferred embodiment of the present invention taken along line A—A of FIG. 5, FIG. 7 is a front view of the continuously operable seat-reclining device 50 for vehicles according to the preferred embodiment of the present invention showing main components exposed when the continuously operable seat-reclining device for vehicles is assembled, FIG. 8 is a cross-sectional view showing main components of the continuously operable seat-reclining device 50 for vehicles according to the preferred embodiment of the present invention when the continuously operable seat-reclining device for vehicles is not operated; and FIG. 9 is a cross-sectional view showing main components of the continuously operable seat-reclining device 50 for vehicles according to the preferred embodiment of the present invention when the continuously operable seat-reclining device for vehicles is operated.

Figure 1:
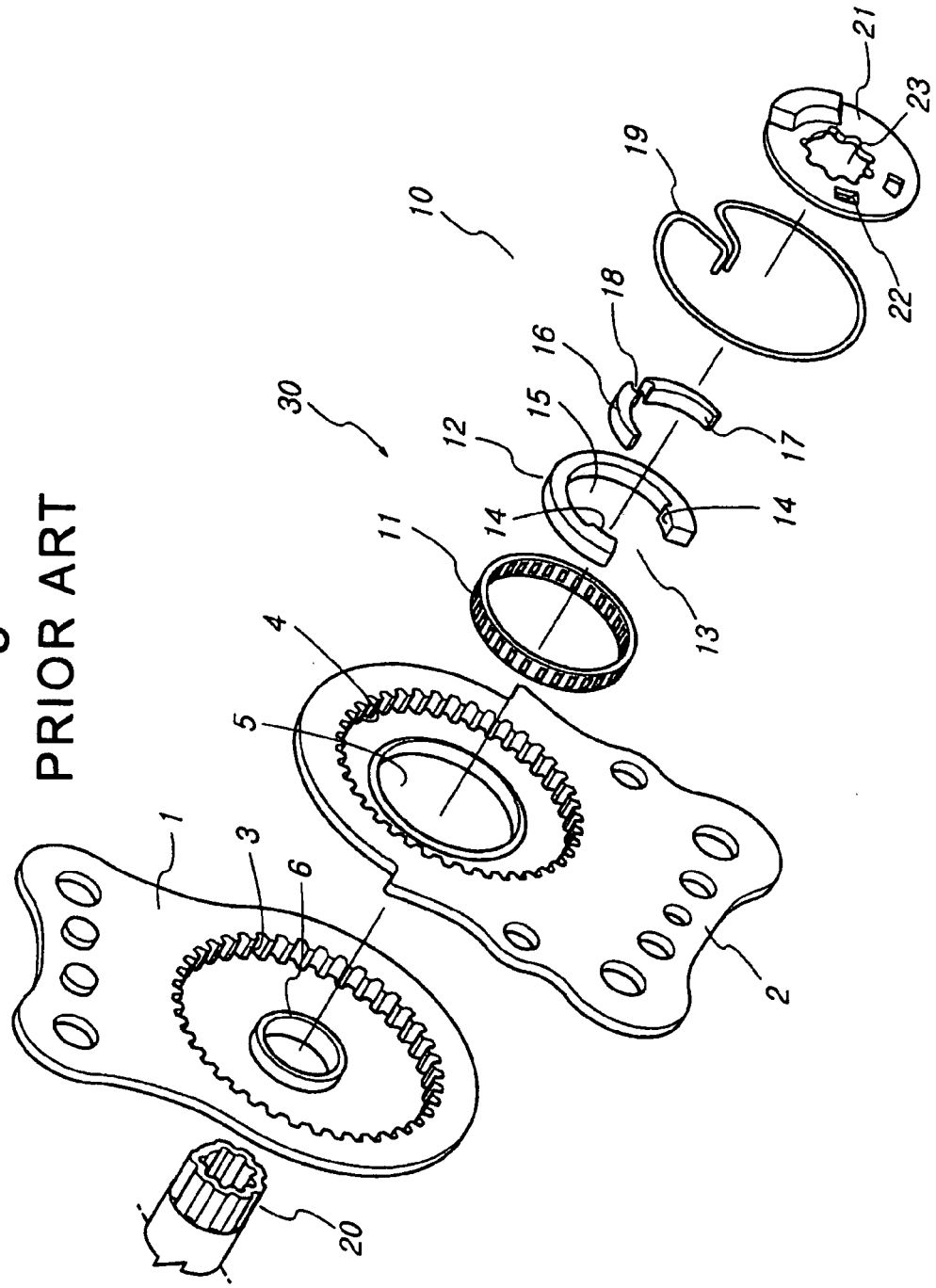
FIG. 1 is an exploded perspective view showing a conventional continuously operable seat-reclining device for vehicles.
Figure 2:
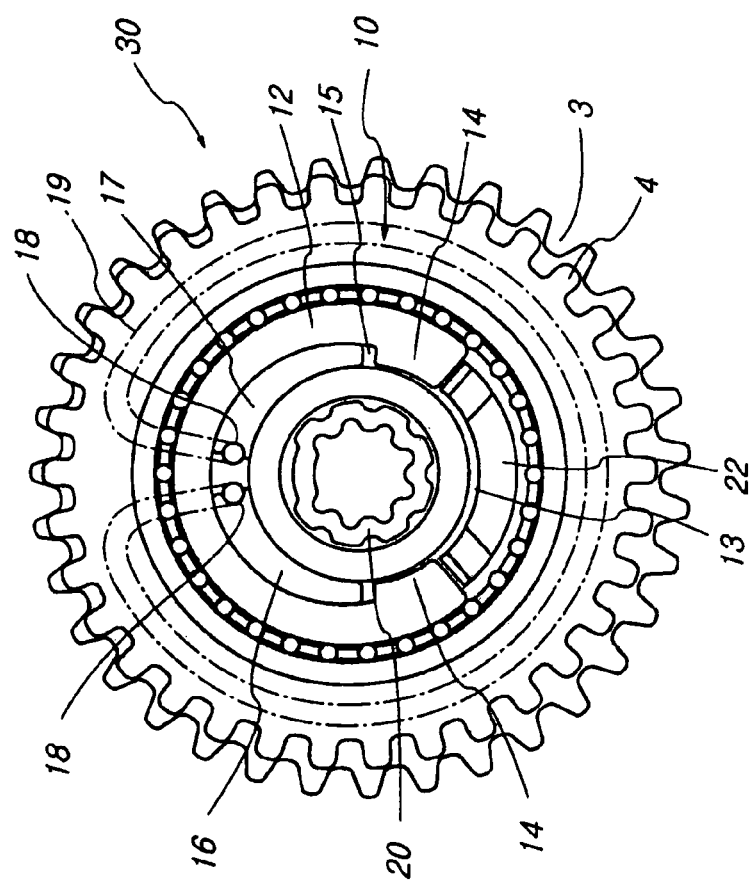
FIG. 2 is a cross-sectional view showing main components of the conventional continuously operable seat-reclining device for vehicles when the conventional continuously operable seat-reclining device for vehicles is not operated.
Figure 3:
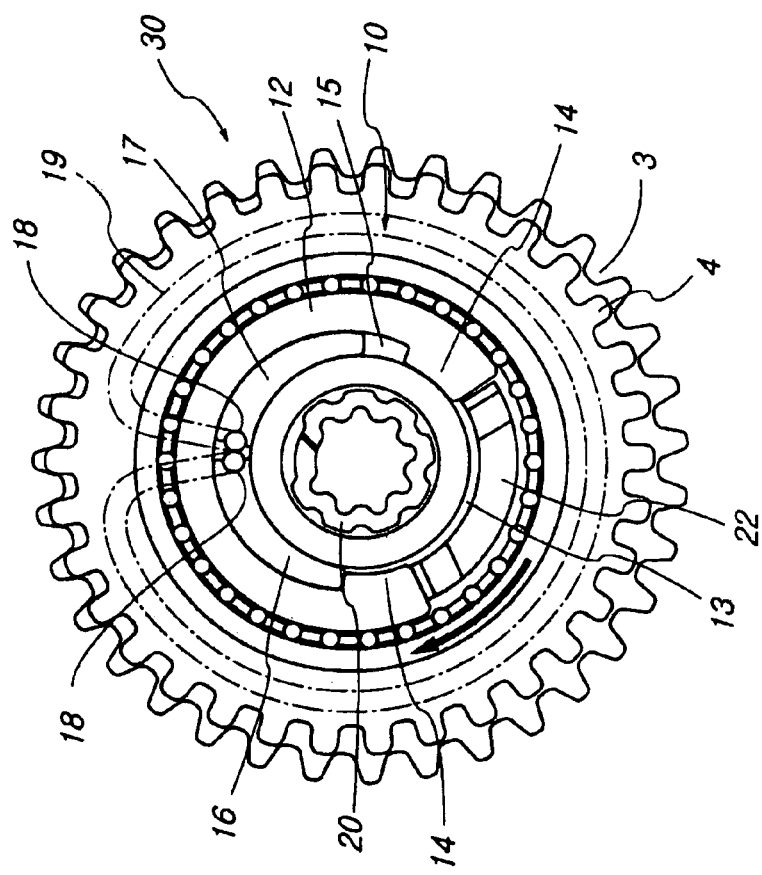
FIG. 3 is a cross-sectional view showing main components of the conventional continuously operable seat-reclining device for vehicles when the conventional continuously operable seat-reclining device for vehicles is operated.
Figure 4:
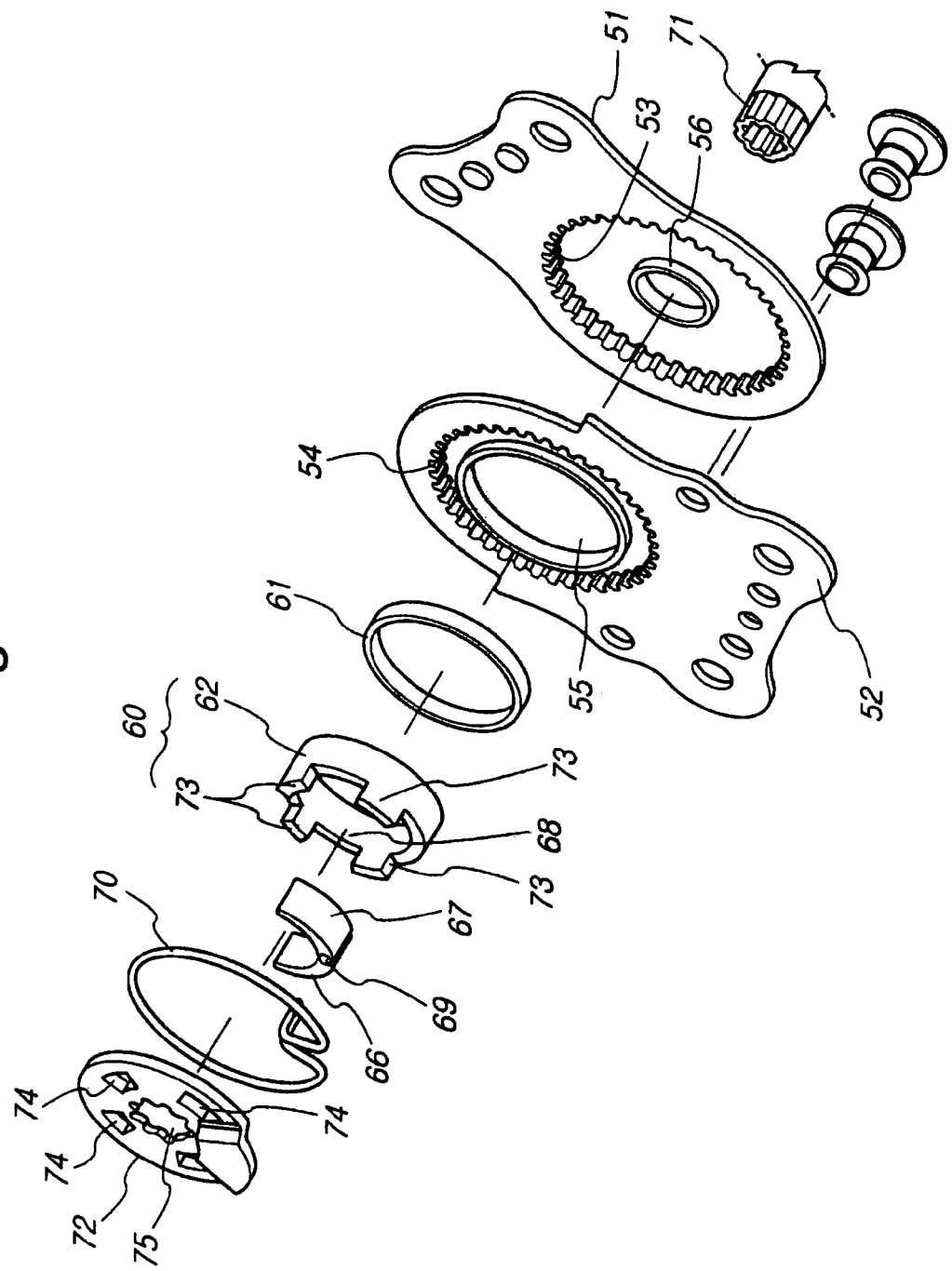
FIG. 4 is an exploded perspective view showing a continuously operable seat-reclining device for vehicles according to a preferred embodiment of the present invention.

The continuously operable seat-reclining device 50 comprises: an upper teeth bracket 51 and a lower teeth bracket 52 securely fixed to a seat back frame and a cushion frame, which together constitute a seat of a vehicle, respectively.

The upper teeth bracket 51 is provided with upper teeth 53, and the lower teeth bracket 52 is provided with lower teeth 54. The upper teeth 53 of the upper teeth bracket 51 are engaged with the lower teeth 54 of the lower teeth bracket 52. The number of the lower teeth 54 is less than that of the upper teeth 53.

At the center of the lower teeth bracket 52 is formed a cam hole 55, and at the upper teeth bracket 51 is formed a cam-maintaining ring 56, which is protruded toward the lower teeth bracket 52.

Between the cam hole 55 and the cam-maintaining ring 56 is disposed an actuator 60 that moves the upper teeth bracket 51 relative to the lower teeth bracket 52 so that a reclining operation is substantially carried out.

The actuator 60 comprises: a slide bearing 61 disposed around the cam-maintaining ring 56 for reducing a frictional force, and thus improving the reclining operation; and a cam 62 disposed inside the slide bearing 61.

The cam 62 is formed in the shape of a circle such that the center P of the cam 61 comes in contact with the inner circumference of the slide bearing 61. Also, the cam 62 has a predetermined eccentricity P2 to the center P1 of the cam-maintaining ring 56. An operating surface 63 of the cam 62, to which an actuating force is transmitted, is protruded as compared to a non-operating surface 64 of the cam 62. Consequently, friction between the slide bearing 61 and of the cam 62 does not occur at the non-operating surface 64 of the cam 62.

Inside the cam 62 is formed a wedge groove 65, in which are disposed arch-shaped wedge blocks 66 and 67 that restrict the operation of the cam 62 to control the movement of the upper teeth bracket 51.

Along the inner circumference of the wedge groove 65 is partially formed a release projection 68, of which the diameter is slightly greater than the outer diameter of the cam-maintaining ring 56. The release projection 68 comes into contact with the ends of the wedge blocks 66 and 67 to release the wedge blocks 66 and 67.

The wedge blocks 66 and 67 are formed such that the sizes of the wedge blocks 66 and 67 are decreased toward the outer ends of the wedge blocks 66 and 67 from the center of the cam-maintaining ring 56. Consequently, the wedge blocks 66 and 67 have eccentricities. Preferably, a tangential angle θ of the wedge block 66 or 67 to the cam-maintaining ring 56 is as small as possible.

This is because the tangential angle θ, which is formed by a connecting point WP where the cam-maintaining ring 56 comes in contact with the wedge block 66 or 67 and a middle point MP between the opposite inner ends of the wedge blocks 66 and 67, multiplied by a spring force SP equals wedge efficiency.

At the opposite inner ends of the wedge blocks 66 and 67 are formed spring grooves 69, respectively. In the spring grooves 69 are disposed wedge springs 70 that increase the distance between the wedge blocks 66 and 67.

To the outside of the cam 62 is attached a coupling 72, which is fixed to a shaft 71 disposed at the rear of the upper teeth bracket 51. To the coupling 72 is attached a driving unit, such as a lever or a motor, that drives the cam 62.

At the outside of the cam 62 are formed a plurality of actuating protrusions 73, which are spaced apart from each other in the radial direction, and at the coupling 72 are formed a plurality of protrusion-fitting grooves 74, in which the actuating protrusions 73 are fitted, respectively. Consequently, a moment-transmitting force of the shaft 71 is uniformly dispersed, whereby smooth operation is guaranteed. Also, the frictional area of the cam 62 is increased, whereby the durability of the cam 62 is improved.

Preferably, the shaft 71 and a shaft hole 75 formed at the coupling 72, through which the shaft 71 is inserted, are formed in directional shapes such that the shaft 71 can be easily inserted through the shaft hole 75 of the coupling 72, the shaft 71 is prevented from being wrongly connected with the opposite recliner, and a rotary moment is easily transmitted by means of the shaft 71.

The directional shapes of the shaft 71 and the shaft hole 75 are not restricted. For example, the shaft 71 and the shaft hole have directional shapes formed by removing one of splines, which are uniformly spaced apart from each other, from the other splines.

The operation of the seat-reclining device 50 according to the present invention will be described hereinafter in detail.

The seat-reclining device 50 is switched between a non-operating state and an operating state. The operating state of the seat-reclining device 50 is the state in that the back of a seat is angularly moved forward or backward.

In the non-operating state, the distance between the opposite inner ends of the wedge blocks 66 and 67 inserted in the wedge groove 65, which is formed at the inside of the cam inserted in the cam hole 55, which is formed at the lower teeth bracket 52, is widened toward the release projections 68 formed at the cam 62 by means of wedge springs 70. As a result, the movement of the cam 62 is restricted.

Also, a gap between the center P of the cam 62 and the center P1 of the cam-maintaining ring 56, i.e., eccentricity P2, is eliminated, whereby the cam 62 is prevented from being moved. Consequently, no gap is generated between the upper teeth 53 and the lower teeth 54.

Since no gap is generated between the upper teeth 53 and the lower teeth 54 as described above, the back of the seat is not moved while the seat-reclining device is not operated, and therefore noise is not generated due to the operation of the seat-reclining device. Consequently, pleasant ride comfort is maintained.

When the seat-reclining device 50 is to be operated, a lever protruded from one side of the seat while being attached to the coupling 72 or a switch that controls the motor connected to the coupling 72 is manipulated such that the back of the seat is angularly moved forward or backward.

As the coupling 72 is rotated in the direction in which the back of the seat is to be angularly moved forward or backward, the cam 62 is rotated in the direction in which the back of the seat is to be angularly moved forward or backward, since the actuating protrusions 73, which are formed at the outside of the cam 62 such that the actuating protrusions 73 are protruded from the outside of the cam 62, are fitted in the protrusion-fitting grooves 74, which are radially formed at the coupling 72.

The cam 62 is rotated by the distance between the cam 62 and the wedge block 66 and 67 disposed in the rotating direction. As a result, the wedge block 66 or 67 is pushed by means of the release projection 68 formed at the inside of the cam 62, whereby the locked state of the wedge blocks 66 and 67 is released.

As the coupling 72 is continuously rotated in the direction in which the back of the seat is to be angularly moved forward or backward, the locked state of the wedge blocks 66 and 67 is released by means of the cam 62. Consequently, the reclining operation is continuously carried out.

At this time, the actuating force of the cam 62 is transmitted to the upper teeth bracket 51 through the slide bearing 61 disposed in the cam hole 55. The upper teeth bracket 51 is rotated in the forward or reverse direction relative to the lower teeth bracket 52 to move pitches corresponding to the difference, in the number of teeth, between the upper teeth 53 and the lower teeth 54. Consequently, the reclining operation is continuously carried out.

When the back of the seat is to be angularly moved in the opposite direction, the actuating unit is manipulated such that the actuating unit is rotated in the opposite direction.

In the case that the recliner is mounted to the opposite side, the eccentric directions of the cam 62 and the wedge blocks 66 and 67 are constantly maintained, since the shaft hole 75 formed at the coupling 72 and the shaft 71 inserted through the shaft hole 75 are formed in directional shapes such that the shaft 71 can be easily inserted through the shaft hole 75 of the coupling 72, the shaft 71 is prevented from being wrongly connected with the opposite recliner, and a rotary moment is easily transmitted by means of the shaft 71. Consequently, the synchronous operation is possible.

According to the present invention, the rotary moment transmitted to the coupling 72 through the shaft 71 is dispersed to several points by means of the protrusion-fitting grooves 74 and the actuating protrusions 73 radially formed at the coupling 72 and the cam 62, respectively. Consequently, the rotary moment is prevented from being concentrated.

As described above, the rotary moment of the shaft is uniformly transmitted to the coupling 72 and the cam 62 through the multi-point dispersion, and thus the smooth operation of the cam is guaranteed. As a result, the frictional area between the cam 62 and the slide bearing 61 that moves the upper teeth bracket 52 is increased, whereby reliable operation of the cam is guaranteed.

Especially, the cam 62 according to the present invention is formed in the shape of a circle such that the cam 62 is stably disposed in the cam hole 55. Also, the stable operation of the cam 62 is guaranteed by means of the slide bearing 61 disposed on the outer circumference of the cam 62. Consequently, easier operation is carried out.

As apparent from the above description, the present invention provides a continuously operable seat-reclining device having an improved actuator to substantially carry out a reclining operation of the reclining device such that an actuating force of a shaft is uniformly transmitted to the entirety of a coupling that moves a cam while the actuator is not affected by vibration, whereby actuating load is reduced, and thus the smooth operation of the seat-reclining device is accomplished while the quality of the seat-reclining device is improved, and convenience of use is improved.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A continuously operable seat-reclining device that can be continuously controlled in a stepless fashion, the device comprising:
   an upper teeth bracket and a lower teeth bracket securely fixed to a seat back frame and a cushion frame, respectively, the upper teeth bracket being provided with upper teeth, the lower teeth bracket being provided with lower teeth, the upper teeth of the upper teeth bracket being engaged with the lower teeth of the lower teeth bracket;
   a cam hole formed at the center of the lower teeth bracket;
   a cam-maintaining ring formed at the upper teeth bracket, the cam-maintaining ring being protruded toward the lower teeth bracket; and
   an actuator disposed between the cam hole and the cam-maintaining ring for moving the upper teeth bracket relative to the lower teeth bracket so that a reclining operation is carried out, the actuator comprising:
      a slide bearing disposed around the cam-maintaining ring for reducing a frictional force, and thus improving the reclining operation, the slide bearing being formed in the shape of a circle;
      a cam disposed inside the slide bearing, the cam being formed in the shape of a circle;
      a wedge groove formed inside the cam;
      arch-shaped wedge blocks disposed in the wedge groove for restricting the operation of the cam to control the movement of the upper teeth bracket;
      a release projection partially formed along the inner circumference of the wedge groove such that the release projection comes into contact with the ends of the wedge blocks to release the wedge blocks;
      wedge springs disposed in spring grooves formed at the opposite inner ends of the wedge blocks for increasing the distance between the wedge blocks; and
      a coupling attached to the outside of the cam, the coupling being fixed to a shaft disposed at the rear of the upper teeth bracket.

2. The device as set forth in claim 1, wherein the cam is provided at the outside thereof with a plurality of actuating protrusions, the actuating protrusions being spaced apart from each other in the radial direction, and the coupling is provided with a plurality of protrusion-fitting grooves corresponding to the actuating protrusions, the actuating protrusions being fitted in the protrusion-fitting grooves such that a moment-transmitting force of the shaft is uniformly dispersed.

3. The device as set forth in claim 1, wherein
   the cam is formed in the shape of a circle such that the outer circumference of the cam comes in contact with the inner circumference of the slide bearing, the cam having a predetermined eccentricity to the center of the cam-maintaining ring, and
   the cam is provided at an outer portion thereof with an operating surface where the slide bearing is in frictional contact with the cam, the operating surface of the cam being protruded as compared to a non-operating surface of the cam.

4. The device as set forth in claim 1, wherein the wedge blocks are formed such that the sizes of the wedge blocks are decreased toward the outer ends of the wedge blocks from the center of the cam-maintaining ring, whereby the wedge blocks have eccentricities.

5. The device as set forth in claim 1, wherein a tangential angle, formed by a connecting point where the cam-maintaining ring comes in contact with one of the wedge blocks and a middle point between the opposite inner ends of the wedge blocks, is small to improve wedge efficiency.

* * * * *